United States Patent

Knudsen, Jr.

[11] Patent Number: 5,564,890
[45] Date of Patent: Oct. 15, 1996

[54] PRODUCT HANDLING PROCESS

[75] Inventor: Peter S. Knudsen, Jr., Hamden, Conn.

[73] Assignee: Progressive Solutions, Inc., Hamden, Conn.

[21] Appl. No.: 361,196

[22] Filed: Dec. 21, 1994

[51] Int. Cl.$^6$ ...................................................... B65G 1/00
[52] U.S. Cl. ........................................................ 414/786
[58] Field of Search ................................ 414/786, 788.1, 414/789.6, 799, 273, 274, 275, 277, 279, 281, 282, 284, 285; 198/347.4, 358

[56] References Cited

U.S. PATENT DOCUMENTS

| | | | |
|---|---|---|---|
| 3,153,487 | 10/1964 | Hoellen | 198/347.4 |
| 3,173,557 | 3/1965 | Eliassen | 198/347.4 |
| 3,533,490 | 10/1970 | Kropf | 186/1 |
| 3,608,746 | 9/1971 | Meyer | 414/789.6 |
| 3,978,571 | 9/1976 | Orlando et al. | 414/789.6 |
| 3,989,090 | 11/1976 | Kawai | 164/228 |
| 4,084,684 | 4/1978 | Skinner, II | 198/467 |
| 4,103,789 | 8/1978 | Andrews et al. | 214/41 |
| 4,527,937 | 7/1985 | Tomasello, Jr. | 414/273 |
| 4,636,634 | 1/1987 | Harper et al. | 250/223 R |
| 4,787,803 | 11/1988 | van Elten et al. | 414/281 |
| 4,976,584 | 12/1990 | Focke | 414/789.6 |
| 4,979,870 | 12/1990 | Mojden et al. | 414/788.4 |
| 5,007,521 | 4/1991 | Tanaka | 198/347.4 |
| 5,097,936 | 3/1992 | Dorner et al. | 198/347.4 |
| 5,098,254 | 3/1992 | Becicka et al. | 414/792.9 |
| 5,147,176 | 9/1992 | Stolzer et al. | 414/786 |
| 5,193,973 | 3/1993 | Tubke | 414/796.9 |
| 5,216,618 | 6/1993 | Arita et al. | 414/273 |
| 5,269,646 | 12/1993 | Focke | 414/789.6 |
| 5,281,081 | 1/1994 | Kato | 414/789.6 |
| 5,284,252 | 2/1994 | Bonnet | 209/552 |
| 5,372,472 | 12/1994 | Winski et al. | 414/789.6 |
| 5,403,147 | 4/1995 | Tanaka | 414/277 |
| 5,472,309 | 12/1995 | Bernard, II et al. | |

OTHER PUBLICATIONS

Product brochure of Woodson Incorporated entitled "presenting The Woodson deep entry pallet storage and retrieval System for high rise density warehousing." (Published 1987).

Primary Examiner—Karen B. Merritt
Assistant Examiner—Douglas Hess
Attorney, Agent, or Firm—DeLio & Peterson

[57] ABSTRACT

A process for handling products comprising the steps of providing a product handling system having a storage structure comprising a plurality of product pallet lanes having product pallets therein, simultaneously replenishing pairs of juxtaposed pallet lanes with corresponding pairs of pallets, determining if there is a product pallet lane depleted of product pallets such that the quantity of product pallets therein is below a first predetermined quantity; and automatically suspending the simultaneous replenishment of pairs of juxtaposed lanes if it is determined that there is a depleted lane, and replenishing only the depleted lane until the quantity of product pallets therein increases to a second predetermined quantity.

19 Claims, 7 Drawing Sheets

PRODUCT HANDLING PROCESS

BACKGROUND OF THE INVENTION

1. Field of the Invention

The present invention relates to a product handling system for storing and retrieving different types of products.

2. Problem to be Solved

Conventional product handling systems utilize elevated storage racks to store various products, and automated retrieval systems for moving products from the racks down to conveyors located below the racks in order to assemble orders comprising diverse products for loading onto a single truck. Each lane in a rack would be devoted to one product (which may be on a pallet), and each product (or pallet) would be moved by the crane to one or more particular primary conveyors devoted to that product. In moving products from the racks to the primary conveyor, conventional product handling systems typically utilize a priority system wherein the first items transferred from the racks to the primary conveyor are those items which were most depleted on the primary conveyors. From the primary conveyors, the different types of products are then assembled to form a final order on secondary conveyors. Once an order is assembled from the various conveyor lines, it is accumulated in the shipping area on a single line in truck load order.

Conventional product handling systems initially palletize the products sent to the storage racks by counting the groups or cases of products that are to be palletized. However, it has been found that counting groups of cases may lead to incorrect assembly of products on pallets. Specifically, if one group of product cases has an undercount, the product handling system may erroneously place a case from a next group of product cases into the pallet of the group of cases having the undercount, thereby improperly mixing the pallet. Another inefficiency of conventional product handling systems is the utilization of a primary conveyor that is completely devoted to a specific type product. Utilization of a conveyor for each type of product results in the use of a large amount of warehouse floor-space and significantly adds to the costs of the system. Furthermore, the aforementioned priority system of conventional product handling systems is a time consuming and inefficient process and results in inconsistent quantities of products on the primary conveyors. Another disadvantage of conventional product handling systems is the dependence on personnel in determining whether certain products are to be sent to the storage racks or directly to the shipping area.

Bearing in mind the problems and inefficiencies of conventional product handling systems, it is an object of the present invention to provide a new and improved process and system for handling products that significantly reduces the probability of error in palletizing products that are to be moved to the storage racks.

It is a further object of the present invention to provide a new and improved product handling process and system that efficiently moves pallets from a plurality of product pallet receiving lanes to storage and/or shipping lanes of a storage structure and maintains desired quantities of products within these lanes.

It is a further object of the present invention to provide a new and improved product handling process and system that automatically determines whether certain products are to be stored or sent directly to a shipping area.

Other objects and advantages of the present invention will be apparent to one of ordinary skill in the art in light of the ensuing description of the present invention.

SUMMARY OF THE INVENTION

The above and other objects, which will be apparent to those skilled in the art, are achieved in the present invention which is directed to, in a first aspect, to a process for handling products comprising the steps of:

(a) providing a product handling system having a storage structure comprising a plurality of product pallet lanes having product pallets therein;

(b) simultaneously replenishing a pair of juxtaposed pallet lanes with a corresponding pair of pallets;

(c) determining if there is a pallet lane depleted of product pallets such that the quantity of product pallets is below a first predetermined quantity; and (d) automatically suspending the replenishing step (b) if the determining step (c) determines there is a depleted lane, and replenishing only the depleted lane until the quantity of product pallets increases to a second predetermined quantity.

The product handling system further includes a palletizing station for palletizing groups of stacks of products cases to form product pallets. The plurality of product pallet lanes comprises a plurality of storage and shipping lanes. The process allows for the replenishment of juxtaposed shipping lanes with pallets retrieved from the palletizing station or a juxtaposed pair of storage lanes.

In another aspect, the present invention is directed to a process of handling products comprising the steps of:

(a) providing a product handling system having a storage structure comprising a plurality of product pallets having product pallets therein, a conveyor for receiving products that are to be promptly shipped, and a floor storage area;

(b) providing a plurality of stacks of product cases;

(c) measuring the spacing between the stacks of product cases to form groups of stacks;

(d) automatically selecting the destination of a particular group of stacks, the destination being chosen from the storage structure, the conveyor and the floor storage area;

(e) palletizing the group of stacks destined for the storage structure to form product pallets;

(f) selecting a pair of pallets for use in replenishing a pair of juxtaposed pallet lanes, the pair of pallets being chosen from the product pallets formed in step (e) and a pair of pallets from another pair of juxtaposed pallet lanes;

(g) simultaneously replenishing the pair of juxtaposed pallet lanes with the pair of product pallets selected in step (f);

(h) determining if there is a product pallet lanes depleted of product pallets such that the quantity of product pallets is below a first predetermined quantity;

(i) automatically suspending the replenishing step (g) if the determining step (h) determines there is a depleted lane, and replenishing only the depleted lane until the quantity of product pallets increases to a second predetermined quantity; and (j) resuming the replenishing step (g) when the quantity of product pallets in said depleted lane is at said second predetermined quantity.

In a related aspect, the present invention is directed to a product handling system, comprising a storage structure comprising a plurality of product pallet lanes having pallets of product cases therein, a transporter for automatically replenishing pairs of juxtaposed pallet lanes with pairs of corresponding product pallets, and a control system for controlling the transporter and recording the quantity of product pallets in each of the product pallet lanes. When the control system determines the presence of a product pallet lanes depleted of pallets such that the quantity of pallets therein is below a first predetermined quantity, it automatically halts the transporter from replenishing the pairs of juxtaposed pallet lanes, and controls the transporter to replenish only the depleted product pallet lanes until the quantity of pallets therein increases to a second predetermined quantity.

In a further aspect, the present invention is directed to a product handling system, comprising a storage structure comprising a plurality of product pallet lanes having pallets of product cases therein, at least one input conveyor having a plurality of stacks of product cases thereon, a fast-out conveyor for receiving products that are to be promptly shipped, a floor storage area, a monitor for measuring the spacing between the stacks of product cases to form groups of stacks, a destination selector for directing a particular group of stacks to a specific destination chosen from the storage structure, the fast-out conveyor and the floor storage area, a palletizer for palletizing groups of stacks of product cases destined for the storage structure, a transporter for retrieving pairs of product pallets from corresponding pairs of juxtaposed pallet lanes and automatically replenishing pairs of juxtaposed pallet lanes with pairs of corresponding product pallets, and a control system for controlling the transporter and recording the quantity of product pallets in each of the product pallet lanes. When the control system determines the presence of a product pallet lane depleted of pallets such that the quantity of pallets therein is below a first predetermined quantity, it automatically halts the transporter from replenishing the pairs of juxtaposed pallet lanes, and controls the transporter to replenish only the depleted product pallet lane until the quantity of pallets therein increases to a second predetermined quantity.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT

Figure 1:
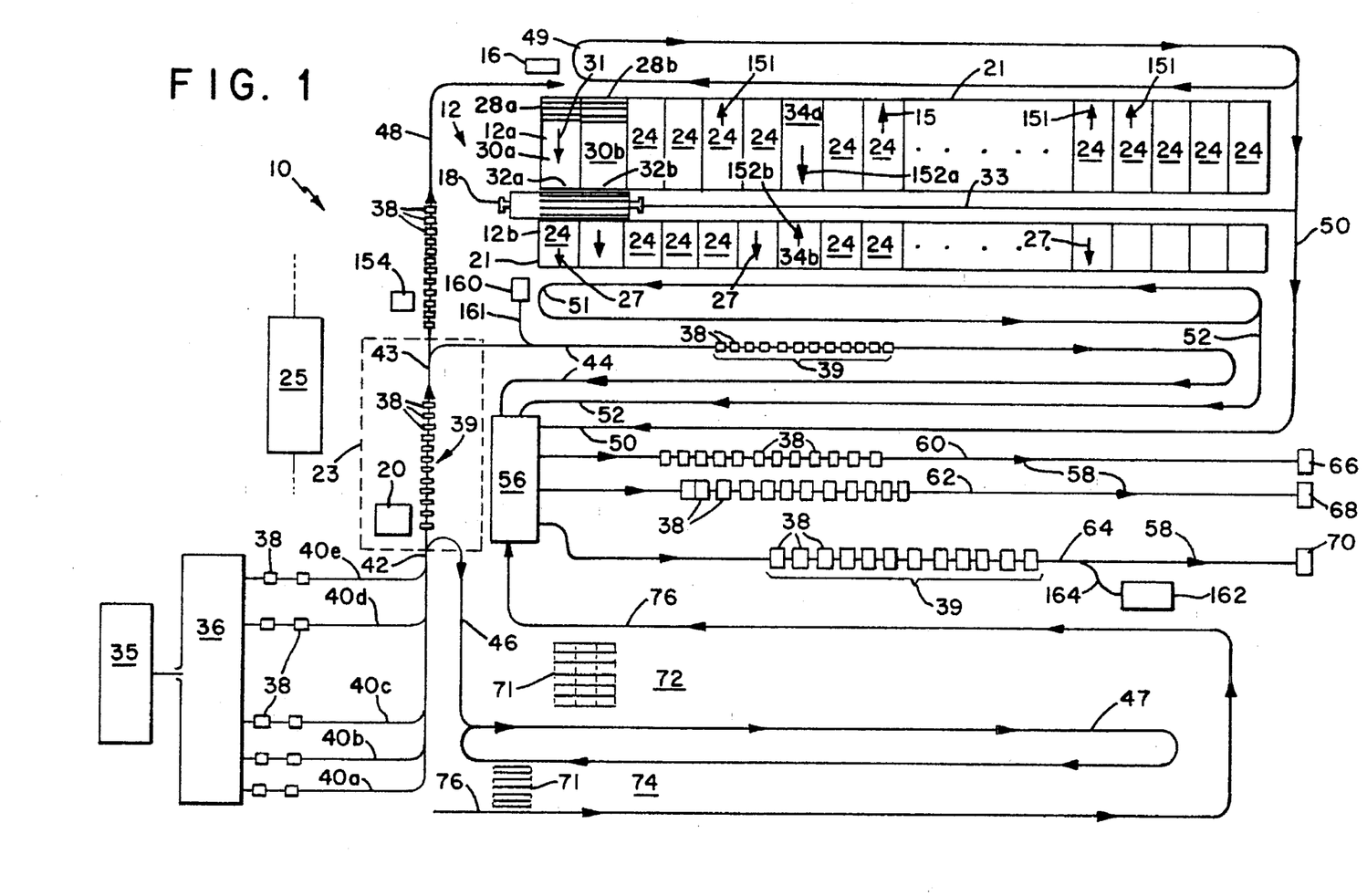
FIG. 1 is a diagrammatical representation of the product handling system of the present invention.
Figure 2:
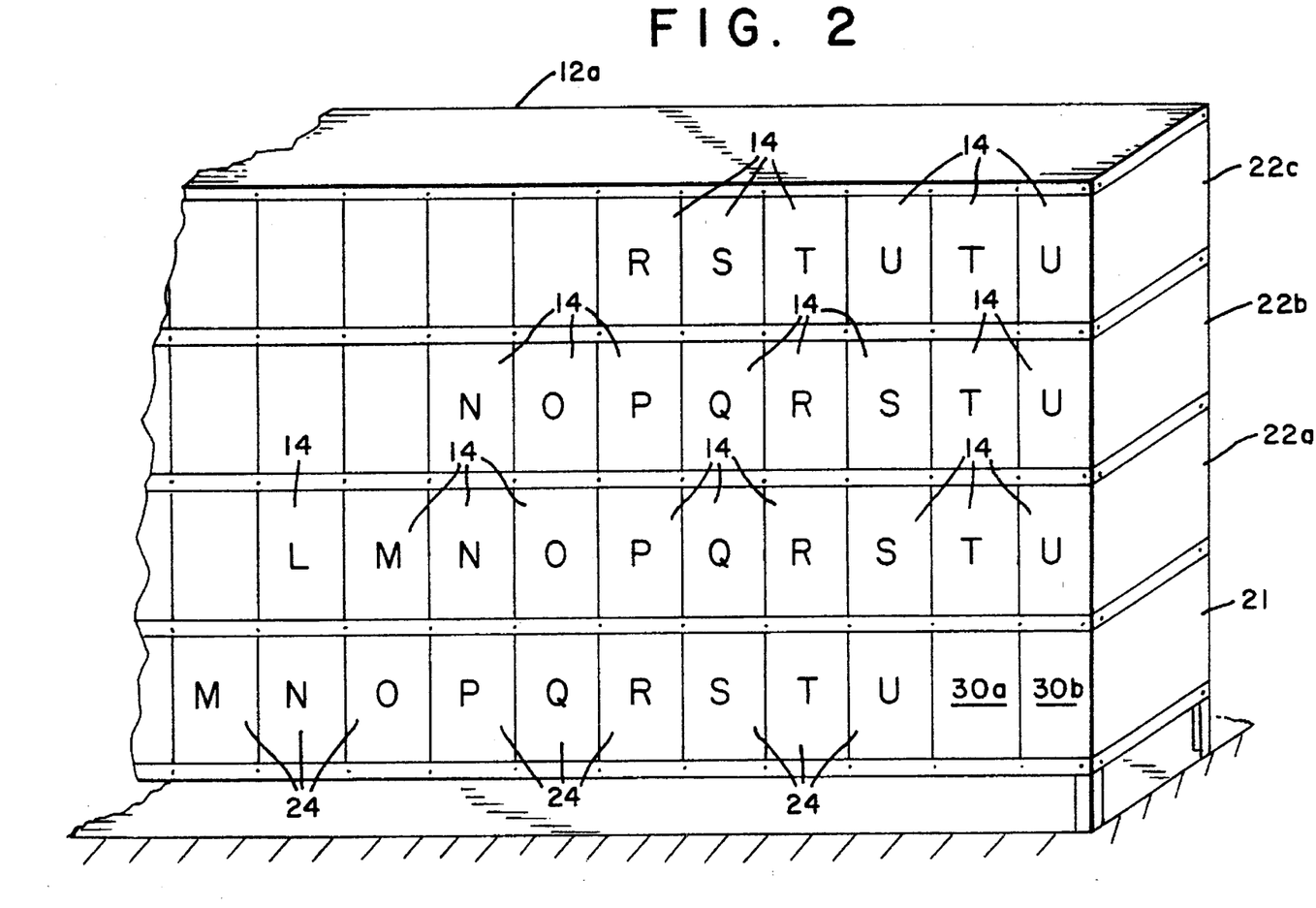
FIGS. 2 and 3 are partial perspective views of a storage structure of the product handling system of FIG. 1 showing a prioritized product storage arrangement.

Referring to FIGS. 1–2, the automated product handling system 10 of the present invention consists generally of storage structure 12, palletizer 16, storage/retrieval machine ("S/R machine") (transporter or crane) 18, monitor 20, destination selector 23 and control system 25.

Control system 25 comprises a computer or other programmable logic circuitry, and preferably includes data storage, which implements many of the functions of the product handling process and system of the present invention which are described in detail below. Control system 25 includes a main control panel, preferably located adjacent destination selector 23 and conveyors 40a–e, and a plurality of secondary control panels. A secondary control panel is located adjacent palletizer 16 and in each of the shipping areas defined and described below.

Figure 3:
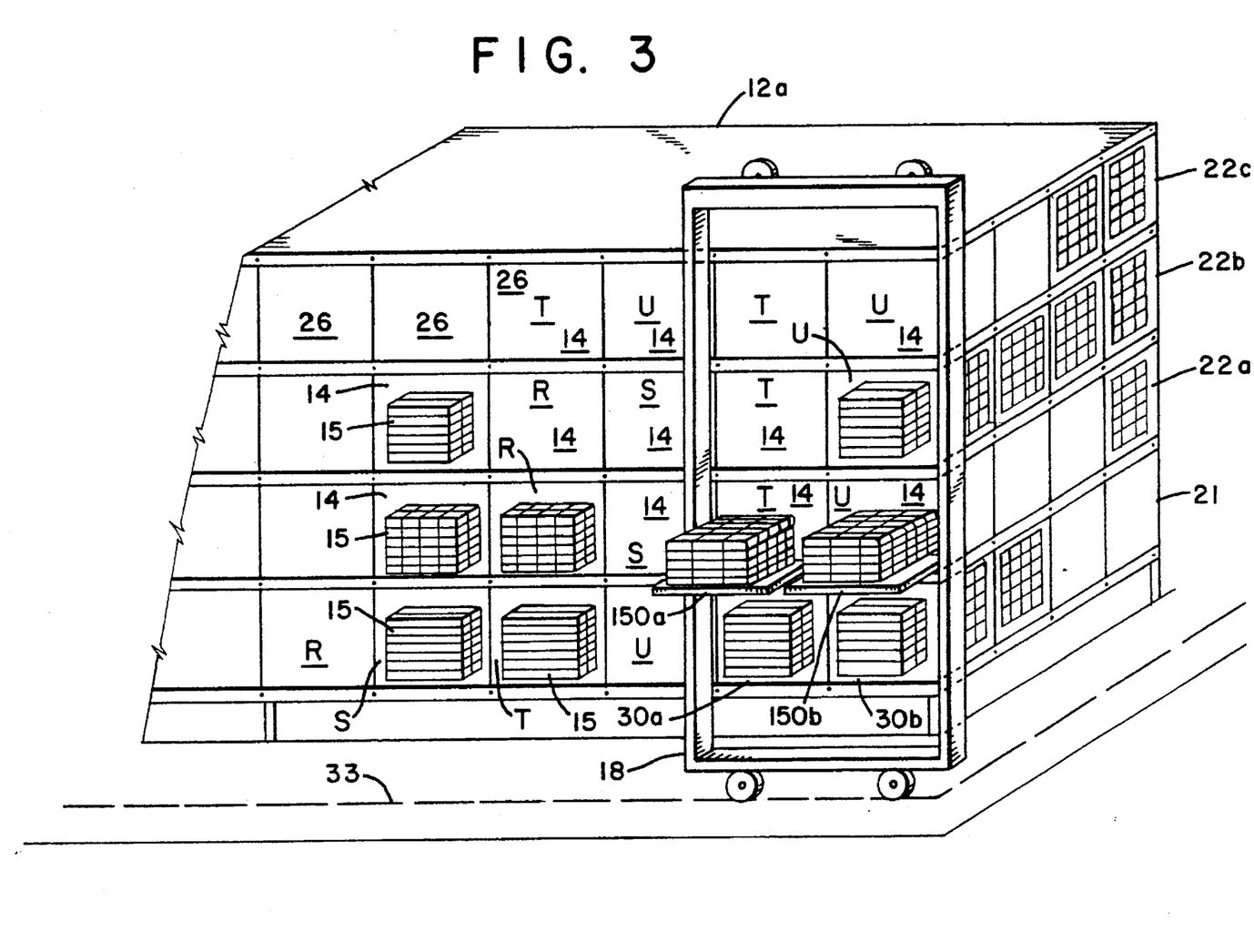

Referring to FIGS. 1, 2 and 3, "high-rise" storage structure 12 consists of two separate storage structures 12a, 12b, each of which preferably comprising four (4) levels. However, the number of levels in storage structures 12a, 12b depend on the particular application, e.g., the type of products involved, the demand for and quantity of such products and the available time schedule allowed for storing, retrieving and shipping products. The shelf life of the product is also a factor in determining how large storage structure 12 may be. Storage structure 12a is dedicated to the storage of high volume (fast moving) products, whereas storage structure 12b is dedicated to the storage of low volume (slow moving) products. Thus, storage structure 12a is larger (deeper) in size than storage structure 12b. Storage structures 12a and 12b are comprised of individual product pallet lanes which consists of storage racks 14 and product shipping lanes 24.

Storage structures 12a, 12b each are comprised of first level 21 and second, third and fourth levels 22a, 22b and 22c, respectively. Second, third and fourth levels, 22a, 22b and 22c, respectively, contain storage racks 14 which are utilized for storage of pallets of products. First level 21 is comprised of juxtaposed product picking or shipping lanes 24 that contain product cases used to form orders for shipment, the process of which will be discussed in detail below. In order to provide time flexibility in the implementation of certain functions of the process of the present invention, racks 14 and lanes 24 preferably have at least three (3) pallets therein. The product inventories of structures 12a and 12b are programmed into control system 25.

S/R machine 18 is similar to a storage/retrieval machine manufactured by Woodson, Incorporated of Lancaster, Pa. and described in a product brochure entitled "*presenting the Woodson deep entry pallet storage and retrieval SYSTEM for high rise high density, warehousing*", the disclosure of which is incorporated herein by reference. S/R machine 18 is movably engaged to track or rail 33 which is positioned between structures 12a and 12b, thereby allowing S/R machine 18 to service both structures 12a and 12b. S/R machine 18 is automated and is connected to control system 25. However, S/R machine 18 also has manual override provisions. In a preferred embodiment, S/R machine 18 is a rectangular, two (2) masted, welded steel frame that includes a carriage that supports an on-board control station that can be manually or automatically operated, a load platform, and at least two (2) rack entry vehicles 150a and 150b (see FIG. 3) for deep-lane pallet storage and retrieval. S/R machine 18 moves horizontally on track or rail 33, whereas the carriage moves vertically as an elevator between the two (2) vertical masts, and the rack entry vehicle moves horizontally, servicing the storage rack depth. Each rack 14 comprises two (2) parallel rails interconnected by perpendicularly connected beams. Each rail is configured to support the pallets and provide a race for the rack entry vehicles. Each rack entry vehicle is driven by an electric motor that receives power and control from the control station though an umbilical cable. In a preferred embodiment, the rack entry vehicle is equipped with an automatic positioning system that is independent of the manual positioning system. Such an automatic positioning system utilizes sensors or a vision system for indicating the nearest pallet under which the rack entry vehicle will position itself. Control system 25 is responsive to the signals emitted from the sensors and positions S/R machine 18 according to the signals received from the sensors. Furthermore, control system 25 is programmed to minimize the required movement of S/R machine 18. Thus, control system 25 and the sensors cooperate to position S/R machine 18 at predetermined storage racks 14 to retrieve specific pallets and then position S/R machine 18 at predetermined product shipping lanes 24 to deposit the pallets in lanes 24. This system increases the speed at which the pallets are picked up and delivered. The rack entry vehicle utilizes a lift that is powered by an electric motor and which lifts the pallet off of the storage rails. Once the pallet is aboard the rack entry vehicle, the rack entry vehicle returns to the home station. In an alternate embodiment, each storage rack 14 of levels 22a–22c are sloped toward the side of the rack adjacent S/R machine 18. Such a configuration results in the pallets rolling toward exits 26 of the individual racks to facilitate retrieval by S/R machine 18. Such a configuration would eliminate deep lane pallet storage and retrieval via the rack entry vehicles.

In a preferred embodiment, control system 25 records and maintains current data pertaining to the inventory (quantity of pallets) in each rack 14 or lane 24. As S/R machine 18 performs operations (retrieval or deposit) upon the pallets in each rack or lane, the on-board control station of S/R machine 18 records the quantity of pallets removed or deposited from or into, respectively, each rack or lane and relays this data to control system 25. Normally under command of control system 25, S/R machine 18 simultaneously replenishes at least two (2) side-by-side or juxtaposed racks 14 or lanes 24, even if there is a different product in each rack 14 or lane 24 (as shown in FIG. 2). When the control system 25 determines the presence of a single rack 14 or lane 24 that is depleted of pallets such that the quantity of pallets therein is below a first predetermined quantity, it automatically halts the S/R machine 18 from simultaneously replenishing the pairs of juxtaposed racks 14 or lanes 24, and controls S/R machine 18 to replenish only the depleted rack or lane until the quantity of pallets therein increases to a second predetermined quantity. In some instances, this means that one (1) rack entry vehicle on S/R machine 18 is not utilized during replenishment. In a preferred embodiment, the first predetermined quantity is five (5) pallets and the second predetermined quantity is defined to be the number of pallets required for the rack 14 or lane 24 to be at ⅔ full capacity. However, the first and second predetermined quantities may be varied according to the specific application, e.g., the time flexibility of the algorithm of control system 25, the type of products involved, etc. In an alternate embodiment, each rack 14 and lane 24 may have pallet-quantity sensors incorporated therein which are connected to control system 25. The sensors produce a signal to indicate the quantity of pallets in each rack 14 and lane 24. The signal has a first state indicating that a rack 14 or lane 24 is depleted of product pallets such that the quantity of product pallets is below the first predetermined quantity. The sensor signal also has a second state indicating when the quantity of product pallets in the rack 14 or lanes 24 is at the second predetermined quantity.

Palletizer 16 is located at the front side of structure 12a. Palletizer 16 palletizes stacks of product cases received on conveyor 48 and then places the assembled pallets 28a, 28b on pallet in-feed or receiving lanes 30a and 30b which are located adjacent palletizer 16 and are on first level 21. Each of lanes 30a and 30b is comprised of a gravity flow or powered conveyor. The assembled pallets 28a, 28b travel down lanes 30a, 30b in the direction indicated by arrow 31 to exits 32a, 32b, respectively. S/R machine 18 travels along track 33, located between structures 12a and 12b, and moves side-by-side (juxtaposed) pallets 28a, 28b to predetermined juxtaposed storage racks 14 or juxtaposed product shipping lanes 24 in either structure 12a or 12b. All retrieval and deposit functions of S/R machine 18 may be performed on at least two (2) side-by-side (juxtaposed) pallets, even if the pallets are different, i.e., different products on each pallet. Empty pallet return lanes 34a and 34b receive empty pallets for transfer to S/R machine 18. Each lane 34a and 34b consists of a gravity flow or powered conveyor. The empty pallets travel down lanes 34a and 34b in the direction of track 33. The empty pallets are then transported back to palletizer 16 for assembling new pallets of products. The distance that empty pallets have to be carried is determined by mathematical calculation based on product movement. The actual location of empty pallet return lanes within storage structure 12 is determined by such calculation so that the total distance traveled by all pallets is minimized. In other words, instead of locating the lanes so that physical distances to other lanes is minimized, such distances are weighted by movement of all product so as to minimize total travel of pallets.

Referring to FIGS. 2 and 3, structures 12a and 12b are arranged in a manner such that the highest volume (fastest moving) products of each are located in the portions of the structures adjacent palletizer 16 and receiving lanes 30a and 30b. Such a configuration minimizes the distance S/R machine 18 must travel. The letters L–U refer to different specific products on the pallets 15 stored in storage racks 14 or product shipping lanes 24. The products are arranged in a manner such that one product is always stored next to a specific product. For example, high-demand products T and U are to the extent possible stored next to one another on each level 21 and 22a–c. Similarly, product S is next to product T, product R is next to product S, etc. Such a storage arrangement allows S/R machine 18 to effect side-by-side (double) deposits and retrievals of pallets to and from, respectively, receiving lanes 30a, 30b, racks 14 and shipping lanes 24. For example, products T and U are palletized by palletizer 16 and then transferred to exits 32a and 32b of receiving lanes 30a and 30b, respectively, by the conveyors of the receiving lanes. S/R machine 18 transports simultaneously the T and U product pallets to any side-by-side (juxtaposed) pair of racks 14 or lanes 24 designated for storage of products T and U.

Product shipping lanes 24 may utilize gravity flow or powered conveyors as discussed above. However, in a preferred embodiment, product shipping lanes 24 utilize conveyors that automatically move product to the closest picking position when an empty pallet is removed. During the picking period, product pickers remove product cases from the pallets in lanes 24 and place the stacks on oval-shaped conveyor 49 which then contains a partial (or possibly full) truckload order. As the pallets are emptied of the product cases, the empty pallets are transferred to lane 34a. The empty pallets then travel in the direction indicated by arrow 152a in order to be retrieved by S/R machine 18. The pickers then operate the conveyors of lanes 24 to move up the next group of pallets. The conveyors of lanes 24 move the pallets in the direction indicated by arrow 151. Conveyor 49 continues onto conveyor 50 where the products are accumulated and carried to load-checker station 56. Similarly, product pickers pick product cases from the pallets on the conveyors in lanes 24 of storage structure 12b and place these products on oval-shaped conveyor 51 which then contains a partial (or possibly full) truckload order. As the pallets are emptied of the product cases, the empty pallets are transferred to lane 34b. The empty pallets then travel in the direction indicated by arrow 152b in order to be retrieved by S/R machine 18. The conveyors of lanes 24 move the pallets in the direction indicated by arrow 27. Conveyor 51 continues onto conveyor 52 where the products are accumulated and carried to load checker station 56 which is described below.

In an alternative embodiment, a depalletizer 160 is provided at the end of one or more selected shipping lanes 24. Conveyor 161 is provided to transfer products directly to one or more fast out lanes 44. In this manner the fast out lane can be used to store a desired quantity of a single product, which quantity does not necessarily conform to a particular order. When used on high volume products, load-checker station 56 then also functions to select such products for combination with other products and delivery to the loading platforms in complete truckload quantities (described in more detail below).

Referring to FIG. 1, prior to being moved to storage structure 12 or other parts of the system, caser 35 effects the packaging of individual products into a case. The operator at caser 35 inputs the product code (SKU number) of each product into the control system 25. A bar code reader can also be used for this purpose if the products have bar codes printed thereon. Stacker 36 arranges the products into stacks of six (6) cases and moves the stacks to production or filler lines 40a–e. The operator then enters the number of stacks released from each of the five (5) filler lines 40a–e into control system 25. The output of production or filler lines 40a–e are merged into a single conveyor 42 which moves the products into destination selector 23.

Destination selector 23 automatically determines to what destination a group of stacks of products are to be sent. This selection is based on the data programmed into control system 25 by the operator. Destination selector 23 includes a multi-outlet conveyor 43, a vision system or optical scanner (not shown), which is connected to control system 25, and a series of pneumatic gates mounted to conveyor 43. The pneumatic gates are connected to a pressurized air source (not shown). Control system 25, in response to the optical scanner, controls the pressurized air source to open or close the pneumatic gates in order to send specific stacks to corresponding destinations within the warehouse. The scanner scans the code on the product cases and inputs this data to control system 25. In response, control system 25 transmits control signals to selector 23 in order to direct products to the corresponding predetermined destinations. The last product case of a "run" of products is tagged to alert control system 25, via the scanner, that the tagged case or stack is the last in that particular series of products. Upon receiving this information, control system 25 will control selector 23 to direct the next "run" of products to its predetermined destination. Destination selector 23 automatically directs particular groups of products to one of three (3) destinations: (1) palletizer 16 for palletization and storage in storage structures 12a or 12b, (2) fast-out lane 44 and (3) conveyor 46. Groups of products selected for palletization move along conveyor 48 which is adjacent automated palletizing station 16. Once palletized, the pallets are then stored in storage racks 14 or product shipping lanes 24 of storage structures 12a or 12b. Groups of products sent to conveyor 46 are merged into floor conveyor 47. Conveyor 47 retains low-demand products 71 that are sold in small quantities and thus, are stored in floor storage areas 72 and 74 and not in storage structure 12. When products stored in areas 72 and 74 are needed to fill orders, the pickers place the products on conveyor 76 which transfers those products to load-checker station 56 where it is combined into a truckload quantity. Products that are to be shipped immediately, or within a short time after completion of the production "run", are sent to fast-out conveyor 44. Thus, these products do not go into storage structure 12. Products on fast-out conveyor 44 are directed to load-checker station 56 which is described below. Fast-out conveyor 44 can also be used to temporarily store accumulated orders.

Referring to FIG. 1, destination selector 23 cooperates with monitor 20 to accumulate a particular number of stacks 38 into groups 39 having a predetermined amount of stacks. In a preferred embodiment, each group 39 consists of twelve (12) stacks 38. Monitor 20 measures the timing or spacing between stacks 38 and thus enables the stacks to be accumulated into groups 39 of twelve (12). Measuring the timing or spacing between the group of stacks, rather than counting cases or stacks themselves, eliminates the problems that might occur if a group should have fewer than the normal number of stacks therein. Measurement of timing or spacing between groups or stacks also helps to determine if one or more stacks have fallen over or if extra stacks are present (thereby reducing or eliminating the gap). Movement of each group of twelve (12) stacks of cases is controlled by control system 25.

Since monitor 20 measures the spacing between the stacks of cases, each stack can be monitored on its way to palletizer 16. If a stack should get lost along the way, monitor 154 positioned along conveyor 48 will effect an alarm to alert the operator that the product handling system must be resynchronized. The operator at palletizer 16 then enters the modified data (change in the quantity of stacks) in control system 25 via a secondary control panel so as to reprogram palletizer 16 and S/R machine 18.

If there are less than six (6) stacks, the operator will temporarily stop operation of destination selector 23 in order to rearrange the cases into a minimum of six (6) stacks which is typically required for pallet stability. Such a pallet constitutes a partial pallet and is recorded in control system 25 via a secondary control panel in order to update the product inventory.

The product pickers pick products from product shipping lanes 24 of structures 12a and 12b, and floor storage areas 72 and 74. Lanes 24 and structures 12a, 12b and storage areas 72 and 74 define three (3) product picking areas. The product pickers in each area work independently of the pickers in the other areas since the availability of products in one picker's area is not dependent upon products in another picking area. Furthermore, the distance that the pickers must move the stacks is significantly decreased. Specifically, the average distance a stack is moved is approximately equal to the distance from the middle of the pallet to the corresponding conveyor. This distance is typically about two (2) to three (3) feet.

Figure 1A:
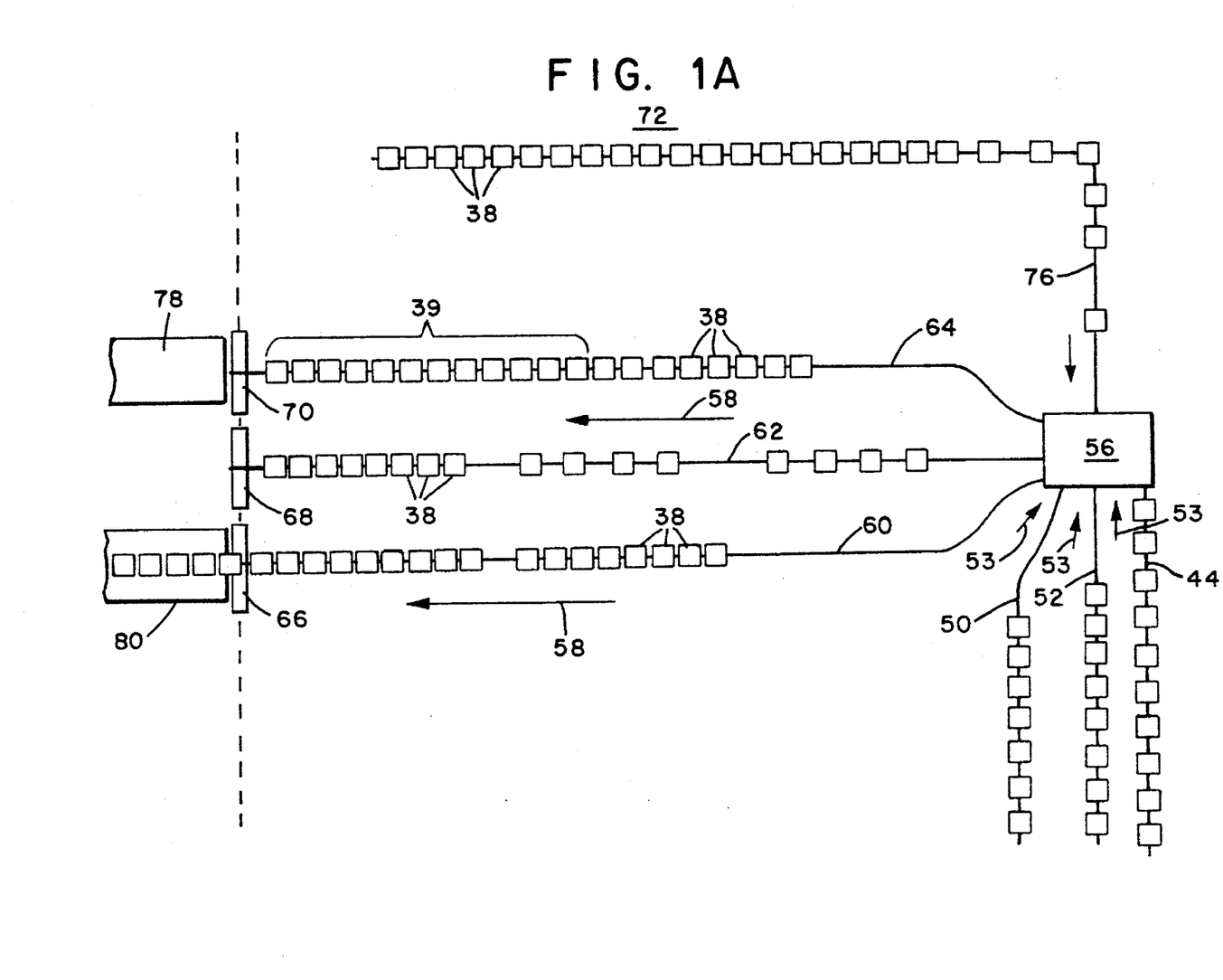
FIG. 1A is a partial enlarged diagrammatical representation of a secondary conveyor system of the product handling system of FIG. 1.

Referring to FIGS. 1 and 1A, conveyors 44, 50 and 52 direct products in the direction indicated by arrows 53 and into load-checker station 56. Load-checker station 56 combines particular groups of these products into predetermined truck loads. Station 56 then automatically directs these products to powered secondary conveyors 60, 62 or 64 that are associated with loading platforms 66, 68 and 70, respectively. The products on conveyors 60, 62 and 64 move in the direction indicated by arrows 58 to platform 66, 68 and 70, respectively. The configuration shown in FIG. 1A makes possible loading at least two (2) trucks simultaneously. For instance, the products on conveyor 60 have been previously accumulated into a truck load and are being loaded onto truck 80 which is positioned at platform 66. Conveyor 64 has products thereon which have been accumulated into a truck load and are ready to be loaded onto truck 78 positioned at platform 70. Conveyor 62 has products thereon which are in the process of being accumulated into a truck load. When each conveyor 60, 62 and 64 has a complete accumulated truck load order thereon, all three (3) orders may be simultaneously loaded into corresponding trucks waiting at the platforms. A palletizer 162 may be provided off a conveyor spur 164 on the loading platforms to palletize product for loading onto the trucks where desired. Station 56 continues to form other orders that can be completed which are accumulated awaiting loading onto trucks.

The automated product handling system of the present invention automatically performs certain functions in an order that depends upon the priority assigned to that particular function. The functions or operations explained below are assigned the corresponding rank of priority.

I. Moderate to Highest Priority

The process of moving palletized products from the receiving lanes 30*a*, 30*b* to product shipping lanes 24, if there is available space in the appropriate product shipping lanes and no older production (products having older date codes) exists in the storage racks 14, can have a priority ranking between moderate and the highest, inclusive. If there is no space available in the appropriate product shipping lane or if there are products having an older date codes (older production) in storage racks 14, then the palletized products are moved to a storage rack and the older production is moved to product shipping lanes 24. As receiving lanes 30*a*, 30*b* reach full capacity, this operation becomes the highest priority. This process of moving palletized products from palletizer 16 to product shipping lanes 24 minimizes the amount of products stored in racks 14. Hence, the throughput of the system is improved since S/R machine 18 is not constantly attempting to bring products to storage racks 14.

II. Moderate to High Priority

The process of moving palletized products from storage racks 14 to product shipping lanes 24 can have a priority between moderate and high, inclusive. As stated above, product shipping lanes 24 serve two (2) purposes;

(i) Provide products for picking and forming orders; and (ii) Storage of products having the oldest date codes (older production).

The priority of which product shipping lanes 24 are replenished, is giving a ranking according to how much product is left in the lanes. If a particular lane has an adjacent lane that can be replenished simultaneously, then the priority of these two (2) lanes increases in relation to the other lanes. S/R machine 18 retrieves two (2) side-by-side product pallets simultaneously from the racks and deposits them to two (2) side-by-side (juxtaposed) product shipping lanes 24 even if the two product pallets are different. The product handling system of the present invention determines the order of replenishment of the product shipping lanes 24 by attempting to replenish as many side-by-side product shipping lanes 24 as possible in order to increase throughput of the system. However, in the event that one product shipping lane 24 is drastically depleted, the system will override the normal side-by-side replenishment program in order to replenish the single depleted product shipping lane 24. Once the single depleted product shipping lane 24 is replenished to a satisfactory level (but still less than full), S/R machine 18 will return to its original program of trying to replenish two (2) side-by-side product shipping lanes 24. This "side-by-side storage and retrieval" feature of the product handling system of the present invention effects an increase in efficiency in replenishing storage racks 14 and product shipping lanes 24 by about 33% over conventional product handling systems.

III. Normally Low to Occasionally High Priority

The process of picking up empty storage pallets and transferring them in empty pallet-returns lanes 34*a* and 34*b* can have a priority between normally low and occasionally high, inclusive. This operation is accomplished when S/R machine 18 is returning to the area adjacent receiving lanes 30*a* and 30*b*. This operation becomes a high-priority operation only when palletizer 16 is depleted of pallets.

IV. Low Priority

The process of resorting the storage racks 14 in a manner such that all products having an older code (older production) are in front of products having recent date codes (newer production) has a low priority. This operation implements the first-in-first-out (FIFO) feature of the product handling system of the present invention and reduces to a minimum the number of storage racks 14 having mixtures of older production and newer production. This operation is usually performed during off-peak hours.

V. Very Low Priority

The process of consolidating partially filled storage racks 14 and product shipping lanes 24 into full racks or lanes has a very low priority and is generally performed during off-peak hours. This operation is performed in a manner so as not to disturb the order of products that result from the resorting process described above. The consolidation process minimizes the travel of S/R machine 18 and significantly reduces the time needed to store and retrieve particular pallets of products. The consolidation process is implemented by an algorithm programmed into control system 25 and thus ensures that the maximum number of empty storage racks 14 is maintained. The algorithm also records the addresses of the empty storage racks 14.

Whenever a product is picked from a picking area, that product is automatically deducted from the inventory. The operators or pickers may accomplish this by issuing commands via secondary control panels. Therefore, the quantity of any product remaining in inventory can be tracked at any point during the picking and loading periods. Thus, the inventory is updated on a real-time basis and is current at all times during the operation of the product handling system of the present invention.

Figure 4A:
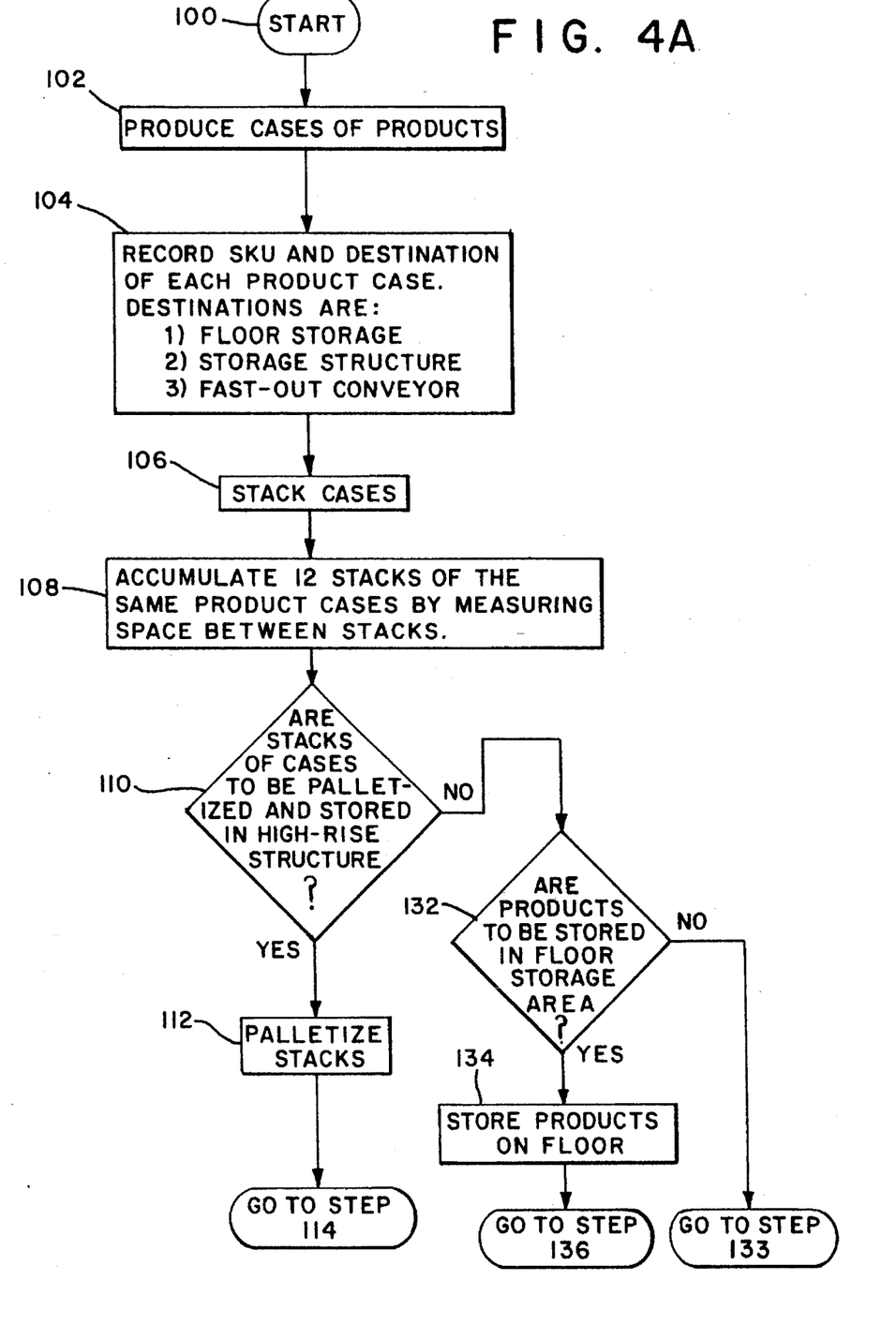
FIGS. 4A, 4B and 4C are flow diagrams illustrating the steps of the product handling process of the present invention.

The product handling process of the present invention will now be described in detail. Referring to FIG. 4A, the process starts at step 100. In step 102, caser 35 receives individual containers of products from product production lines and forms cases of products, each case having a predetermined number of individual product containers therein. In step 104, an SKU number is assigned to each case and each case is tagged for a predetermined location. The SKU number and destination of each product case are recorded in control system 25 by the operator. However, the operator may divert the product to a different destination if necessary. The possible destinations for the product cases are: (1) conveyor 48 (palletizer 16), (2) fast-out conveyor 44, and (3) conveyor 46 (floor storage areas 72 or 74). After step 104, step 106 effects stacking of cases, via stacker 36, into stacks of six (6)

cases. The stacks of cases are then sent to filler lines 40*a–e*. Filler lines 40*a–e* are then merged into single conveyor 42. Conveyor 42 directs the stacks of product cases into destination selector 23. After step 106, step 108 effects an accumulation of twelve (12) stacks of the same products. This is accomplished by monitor 20 measuring the spacing between the stacks. After step 108, step 110 determines, via destination selector 23, whether the stacks of products are to be palletized and stored in storage structure 12. If the stacks of cases are to be stored in storage structure 12, then step 112 effects palletization of the group of twelve (12) stacks via palletizer 16. After step 112, step 114 effects the transferal of the assembled pallet to S/R machine 18. After step 114, step 116 determines whether the pallet contains high-volume (high-demand) products. If the pallet does contain high-volume products, then step 118 effects storage of the pallet in the product pallet lanes (either racks 14 or lanes 24) of storage structure 12*a*. If in step 116, it is determined that the pallet does not contain high-volume products, then step 117 effects storage of the pallet in the product pallet lanes (either racks 14 or lanes 24) of storage structure 12*b*. The process then shifts to step 120 which will be described below.

Figure 4B:
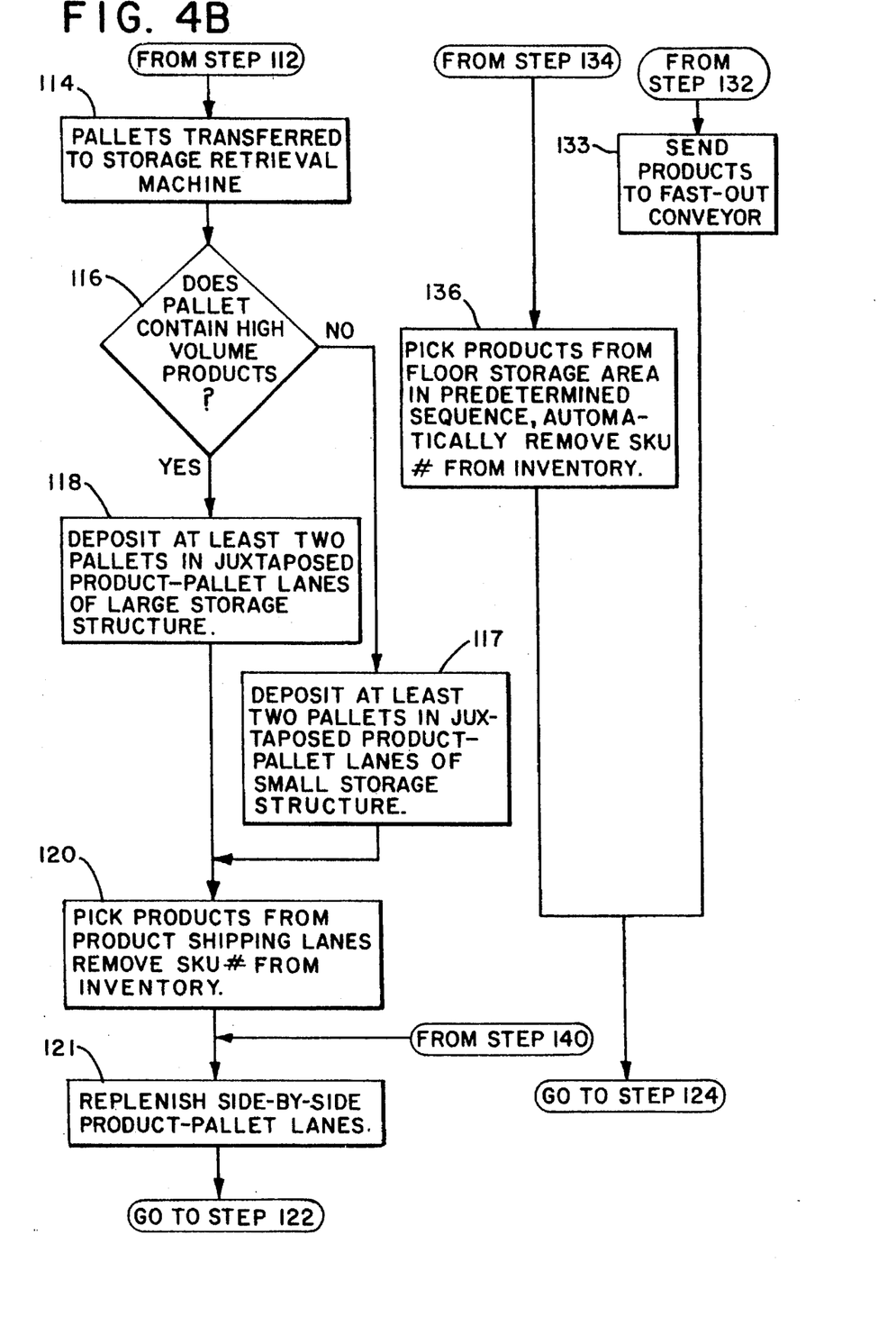

If in step 110, it is determined that the products are not to be palletized and stored in storage structures 12*a* or 12*b*, step 132 then determines whether the products are going to floor storage areas 72 or 74. If the products are destined for areas 72 or 74, then step 134 effects storage of these products in floor storage areas 72 or 74 via conveyors 46 and 47. The process then shifts to step 136. Step 136 effects the picking of products from floor storage areas 72 and 74 by individual pickers. The pickers place the picked products on conveyor 76 which accumulates and transports the products to load checker station 56. The SKU number of the picked products are automatically deducted from the product inventory. The process then shifts to step 124.

If in step 132, it is determined that the products are not going to floor storage areas 72 or 74, then step 133 effects a transfer of the products to fast-out conveyor 44. The process then shifts to step 124.

Step 120 effects the retrieval of products from product shipping lanes 24 of storage structure 12 (structures 12*a* or 12*b*). This is accomplished by individual pickers picking products in a predetermined sequence from product shipping lanes 24 from storage structures 12*a* or 12*b* and placing the products on conveyors 49 and 51, respectively. Conveyors 49 and 51 merge into conveyor 50 and 52, respectively. Products picked from product shipping lanes 24 are immediately and automatically deducted from the inventory which is recorded on control system 25. The products picked from product shipping lanes 24 are accumulated on conveyors 50 and 52 which transport the products to load-checker station 56.

After step 120, step 121 effects replenishment of side-by-by (juxtaposed) product-pallet lanes of structures 12*a* or 12*b*. After step 121, step 122 determines if there is a product-pallet lane (either a storage rack 14 or a product shipping lane 24) that is severely depleted of product such that the quantity of pallets in the lane are below a predetermined quantity. If step 122 determines that there is a product-pallet lane that is severely depleted, the process shifts to step 138. Step 138 effects the suspension of the side-by-side replenishment routine of step 121. After step 138, step 140 effects the replenishment of the severely depleted product-pallet lane via S/R machine 18 until the quantity of pallets in the product-pallet lane reaches a predetermined amount. Once this predetermined amount is attained, S/R machine 18 (via control system 25) automatically ceases the replenishment of the depleted product-pallet lane. The process then shifts to step 121 for the resumption of the side-by-side replenishment of the product-pallet lanes.

Figure 4C:
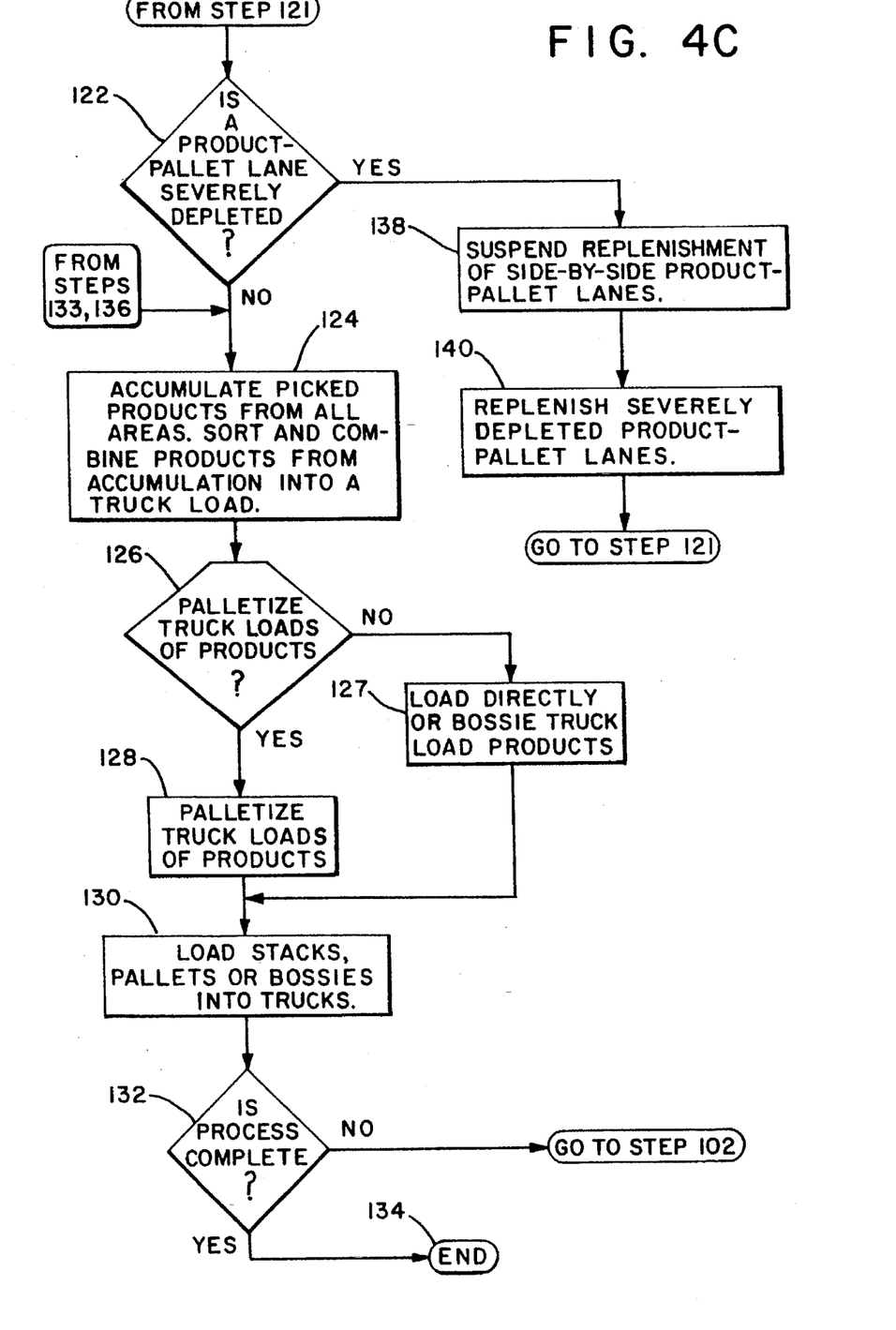

Once the severely depleted product-pallet lane is replenished, the second pass through steps 121 and step 122 will result in the process continuing at step 124. Step 124 consists of two (2) separate steps: (i) accumulating products on conveyors 44, 50, 52 and 76, and (ii) combining the accumulated products (via station 56) on conveyors 44, 50, 52 and 76 into groups of products, each of which forming a separate "truck load" order. Station 56 then directs the appropriate group of products to corresponding conveyors 60, 62 or 64. Each group of products is accumulated on a corresponding conveyor 60, 62 and 64 until a complete truck load order is formed.

After step 124, step 126 then determines whether the "truck load" of products are to be pre-palletized prior to being loaded into the trucks waiting at loading platform 66, 68 and 70. If the products are to be pre-palletized, then step 128 effects palletizing of the products on conveyors 60, 62 and 64 prior to being loaded onto the truck. After step 128, step 130 effects the actual loading of the pre-palletized products into the trucks.

If in step 126, it is determined that the products are not to be pre-stacked, then step 127 effects either: (1) placing the products on pallets, or (2) loading stacks or placing the products on bossies. After step 127, step 130 effects loading the products into the trucks waiting at the loading platforms. After step 130, step 132 determines whether the process is complete. If the process is not complete, then the process shifts to step 102. If step 132 determines that the process is complete, then the process shifts to step 134.

The product handling system of the present invention may be used for handling any product which is normally packed in case or pallet form. Specifically, the process can be used with dairy products, i.e., milk containers which have a very limited shelf life and therefore must be shipped in a timely fashion. Furthermore, the product handling system may be designed according to customer requirements, e.g., different types of products, quantity of products, product demand, etc. Thus, the quantity of conveyors, storage racks, product shipping, lanes, etc., that are utilized depend on customer requirements.

While the present invention has been particularly described, in conjunction with specific preferred embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A process for handling products comprising the steps of:

(a) providing a product handling system having a storage structure comprising a plurality of product pallet lanes, each of which having a quantity of product pallets therein;

(b) simultaneously replenishing pairs of juxtaposed pallet lanes with corresponding pairs of pallets;

(c) determining if there is a pallet lane depleted of product pallets such that the quantity of product pallets is below a first predetermined quantity; and (d) automatically suspending said simultaneous replenishing step (b) if said determining step (c) determines there is a depleted lane, and replenishing only the depleted lane until the quantity of product pallets in the depleted lane increases to a second predetermined quantity.

2. The process of claim 1 further including the step of resuming said simultaneous replenishing step (b) when the quantity of product pallets in said depleted lane is at said second predetermined quantity.

3. The process of claim 1 wherein said step (b) further includes the step of palletizing a plurality of stacks of product cases to produce product pallets.

4. The process of claim 1 wherein at least one of said juxtaposed pairs of pallet lanes contains two different products.

5. The process of claim 1 wherein in step (b), the juxtaposed pallet lanes are replenished with product pallets retrieved from another pair of juxtaposed pallet lanes.

6. The process of claim 5 wherein said plurality of pallet lanes comprises a plurality of storage racks and a plurality of product shipping lanes.

7. The process of claim 6 wherein said replenished product pallet lanes are product shipping lanes and said another pair of juxtaposed product pallet lanes are storage racks.

8. The process of claim 1 further including the step of providing a plurality of stacks of product cases separated by spaces.

9. The process of claim 8 further including the step of measuring the spacing between the stacks of product cases to form groups of stacks.

10. The process of claim 9 wherein said system further includes:

a conveyor for receiving product cases that are to be promptly shipped; and a floor storage area.

11. The process of claim 10 further including the step of automatically selecting a destination for each stack provided by said providing step, each destination being chosen from said storage structure, conveyor and floor storage area.

12. The process of claim 11 wherein said plurality of product shipping lanes comprises a plurality of storage racks and a plurality of product shipping lanes, and said storage structure comprises a first portion for receiving pallets containing high-volume products and a second portion for receiving low-volume products.

13. The process of claim 12 further including the steps of:

picking products from said product shipping lanes of said first and second portions of said storage structure, said conveyor and said floor storage area;

accumulating the picked products; and combining the products picked in said picking step into at least two product orders.

14. The process of claim 13 further including at least two juxtaposed product-output conveyors, each of which receiving a corresponding product order.

15. The process of claim 1 wherein said plurality of product pallet lanes comprises a plurality of storage racks and a plurality of product shipping lanes.

16. The process of claim 15 wherein the juxtaposed product pallet lanes that are replenished are product shipping lanes.

17. The process of claim 15 wherein said system further includes:

a conveyor for receiving product cases that are to be promptly shipped; and a depalletizer adjacent said product shipping lanes.

18. The process of claim 17 further including the steps of:

depalletizing product pallets in said product shipping lanes; and transferring the depalletized products to said conveyor.

19. A process for handling products comprising the steps of:

(a) providing a product handling system having a storage structure comprising a plurality of product pallet lanes, each of which having a quantity of product pallets therein, an input conveyor, a fast-out conveyor for receiving products that are to be promptly shipped, and a floor storage area;

(b) providing a plurality of stacks of product cases on said input conveyor;

(c) measuring spacing between the stacks of product cases to form groups of stacks;

(d) automatically selecting the destination of a particular group of stacks, the destination being chosen from said storage structure, said fast-out conveyor and said floor storage area;

(e) palletizing the group of stacks destined for said storage structure to form product pallets;

(f) selecting a pair of pallets for use in replenishing a pair of juxtaposed pallet lanes, said pair of pallets being chosen from the product pallets formed in step (e) and a pair of pallets from another pair of juxtaposed pallet lanes;

(g) simultaneously replenishing the pair of juxtaposed pallet lanes with the pair of product pallets selected in step (f);

(h) determining if there is a product pallet lane depleted of product pallets such that the quantity of product pallets is below a first predetermined quantity;

(i) automatically suspending said simultaneous replenishing step (g) if said determining step (h) determines there is a depleted lane, and replenishing only the depleted lane until the quantity of product pallets in the depleted lane increases to a second predetermined quantity; and (j) resuming said simultaneous replenishing step (g) when the quantity of product pallets in said depleted lane is at said second predetermined quantity.

* * * * *